(No Model.)

J. PETERSON.
REIN GUARD FOR HARNESS.

No. 376,677. Patented Jan. 17, 1888.

Witnesses
Geo. Morse
John H. Biggers

Inventor
James Peterson
by C. A. Snow & Co.
Attorneys

UNITED STATES PATENT OFFICE.

JAMES PETERSON, OF BURLINGTON, IOWA.

REIN-GUARD FOR HARNESS.

SPECIFICATION forming part of Letters Patent No. 376,677, dated January 17, 1888.

Application filed September 15, 1887. Serial No. 249,786. (No model.)

*To all whom it may concern:*

Be it known that I, JAMES PETERSON, a citizen of the United States, residing at Burlington, in the county of Des Moines and State of Iowa, have invented a new and useful Improvement in Rein-Guards, of which the following is a specification.

My invention relates to an improvement in rein-guards; and it consists in the construction and arrangement of the parts thereof, which will be more fully hereinafter described, and pointed out in the claim.

Figure 1:
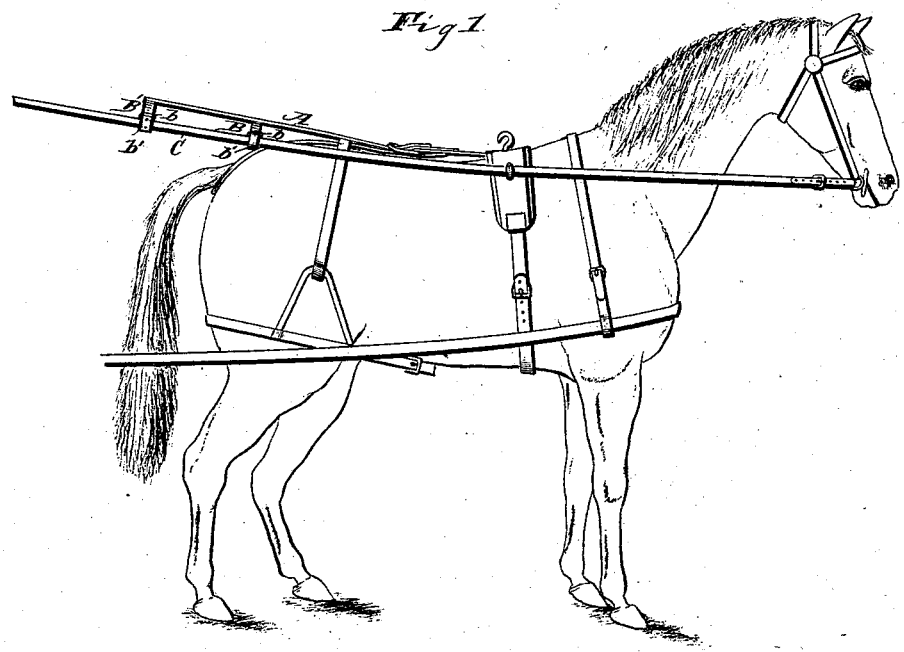
Figure 2:
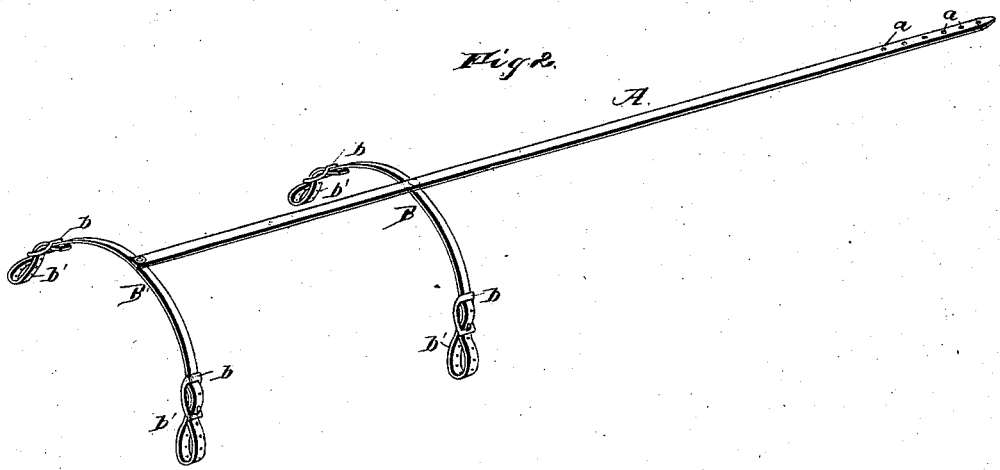

In the accompanying drawings, wherein like letters of reference indicate similar parts in the several views, Figure 1 is a side elevation of an animal having harness mounted upon him and my improvement shown in connection with the harnesss. Fig. 2 is a detail perspective view of my improved rein-guard.

A indicates a central or back strap, which is constructed of suitable length, having buckle-holes *a* formed in the front end thereof for attachment to the back-strap of harness. The end of this strap A, having the holes *a*, is adapted to be secured to the buckle used for shortening the back-strap of harness, which is usually situated just in the rear of the harness-saddle; or the end of the said strap may be otherwise secured to the back-strap of harness by any suitable and desirable means.

At the rear portion of the strap A two cross-straps, B B', are mounted upon and secured to said strap A by riveting, sewing, or otherwise. The forward strap, B, is secured some distance ahead of the rear strap, B', and a series of said straps may be employed, if desired. The outer ends of each of the straps B and B' are provided with loosely-mounted buckles *b*, the ends of said straps being doubled on themselves and secured by said buckles to form loop *b'*. The reins C are passed through the loops *b'*, the said loops being of such size as to permit an easy passage of the reins therethrough, but not permitting any loose movement of the reins after being mounted therein.

By the use of my improvement the reins are held at a regular distance apart and prevented from dropping down over the sides of the animal and from being caught by any portion of the harness, which often occurs. Furthermore, the reins are prevented from getting under the animal's tail, which often proves to be a great annoyance to a driver.

It will be observed that my device is very light and yielding, so as to readily accommodate itself to the position of the reins. The device not only prevents the reins being caught in any portion of the harness, or the animal swinging his tail over the reins, but also allows free movement of the reins, so that the pull on the reins will be applied directly to the animal's mouth. Should the driver be on the ground by the side of the horse or the vehicle and holding the reins, the guard readily adapts itself to the position of the lines, so as to allow them to pass across the back of the animal. This feature of my device is peculiarly advantageous, for the reason that should the horse start the driver will have perfect control over him, for the reason that the reins coming across the animal's back the pull exerted upon them will be applied directly to the animal's mouth. So far as I am aware the rein-guards heretofore devised have been so arranged and constructed that it was impossible for the reins to pass across the back of the animal, and the pull on the reins is consequently not applied directly to the mouth of the animal. My device is also advantageous in its use, for the reason that when the animal is "hard-mouthed" it is often essential to raise the reins some distance to one side of the animal, and this action is readily performed with my device, as it is secured to the harness at only one point and is very light and yielding. So far as I am aware the devices heretofore provided have been unyielding and have held the reins in a fixed position.

The device is thus seen to consist of a longitudinal sufficiently-stiff strap, A, secured to the harness at its front end in such manner that it can be swung to either side, and two or more cross-straps, B B', also having a sufficient degree of stiffness and provided at their ends with integral rein-loops formed by means of the loose buckles *b*, so that when the reins are pulled on at or near a right angle to the horse's back they will not bind in the said loops, as the strap A will turn laterally and the whole force will fall on the bit in the horse's mouth. The reins can also be lifted vertically when necessary from the point of attachment of the strap A, so that the reins are also prevented from binding in the loops in this direction. It is evident, as the strap A is connected to the harness at its front end only and as the reins pass rearwardly at short distances only from the said strap, that should the horse switch his tail upward he would thereby lift the reins and strap A and not throw his tail thereover.

I am aware that a back-strap or bar and loop have been used as parts of rein holders and guides, and such I do not desire to claim, broadly.

Having thus described my invention, what I claim as new is—

The herein-described rein holder and guide, composed of the longitudinal strap A, provided at its front end with an adjustable attachment to the back-strap of the harness, the transverse straps B B', secured at proper points to the strap A, near its rear end, and provided with the integral adjustable rein-loops $b'$ $b'$, and the buckles $b$ $b$, completing said loops, substantially as specified.

In testimony that I claim the foregoing as my own I have hereto affixed my signature in presence of two witnesses.

JAMES PETERSON.

Witnesses:
R. P. ROBINSON,
C. C. FOWLER.